B. M. SHIPLEY.
CASH REGISTER.
APPLICATION FILED FEB. 5, 1919.

1,360,151.

Patented Nov. 23, 1920.
5 SHEETS—SHEET 1.

Inventor
BERNIS M. SHIPLEY
BY Carl Benst
Henry E. Stauffer
Attorneys

UNITED STATES PATENT OFFICE.

BERNIS M. SHIPLEY, OF DAYTON, OHIO, ASSIGNOR TO THE NATIONAL CASH REGISTER COMPANY, OF DAYTON, OHIO.

CASH-REGISTER.

1,360,151. Specification of Letters Patent. Patented Nov. 23, 1920.

Application filed February 5, 1919. Serial No. 275,187.

*To all whom it may concern:*

Be it known that I, BERNIS M. SHIPLEY, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers and the like, the primary object being to devise an improved indicator controlling mechanism for machines of the class illustrated and described in the application for Letters Patent of the United States of Frederick L. Fuller, Serial No. 236,201, filed May 23, 1918. In the present machine the indicators are not returned to zero position at each operation of the machine as is the case in the machine in the above referred to application, but are set direct from the position in which they were left in the previous operation, thus eliminating much extra movement of the indicators and at the same time making it easier for them to be set.

The present machine differs from the one illustrated in the above mentioned Fuller application, in that the present machine is provided with an initial bank of keys whereas in the former machine there is no such bank.

Another object of this invention is to provide the machine herein with special counters for registering the number of transactions such as "Cash", "Received on account", "Charge" and "Paid out", on separate counters.

Another object of the present invention is that the indicator controlling mechanism is so designed that it is adapted to be used in "lever set" machines of the class illustrated and described in Letters Patent of the United States No. 751,611, issued to Thomas Carroll, February 9, 1904.

With these and incidental objects in view the invention consists in certain novel features of construction and combination of parts, the essential elements of which are set forth in appended claims, and a preferred form of embodiment of which is hereafter described with reference to the drawings which accompany and form a part of the specification.

Described in general terms, the machine in the preferred form comprises a plurality of manipulative devices, such as key banks having depressible keys, for setting up the amount, transaction and clerks' initials.

The amount manipulative devices coöperate with oscillating differential mechanisms which, in turn, operate reciprocating differential mechanisms whereby the amounts commensurate with the value of keys depressed are accumulated upon a totalizer, the engagement of said totalizer with the reciprocating differential mechanisms being under the control of the transaction bank of keys. For "Cash" and "Received on account" transactions the totalizer is engaged with the differential mechanism, but for "Charge" and "Paid out" transactions said totalizer is not engaged with the differential mechanism.

The reciprocating differential mechanism coacts with an improved indicator controlling device for positioning the indicators commensurate with the value of the keys depressed, directly from the position in which they were left at the end of a previous operation of the machine.

The machine herein is also provided with special counters for registering on individual counters the number of different classes of transactions, such as "Cash", "Received on account", "Charge" and "Paid out".

Keyboard.

Figure 1:
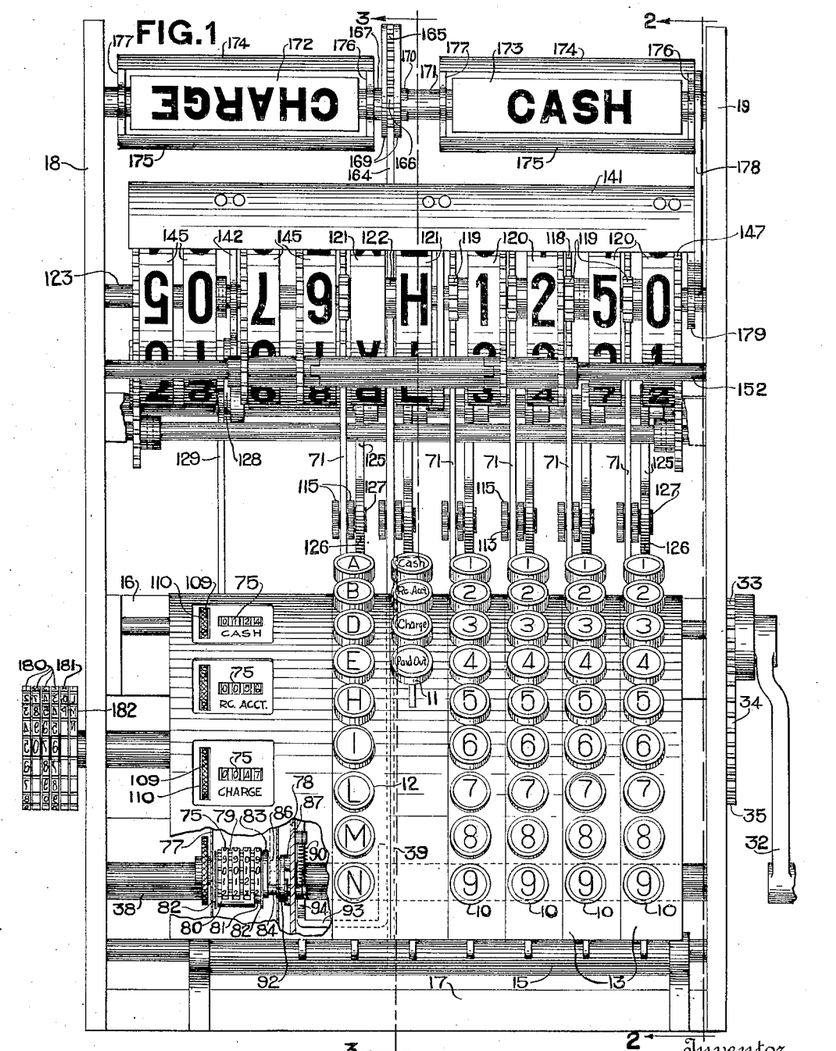
Figure 1 is a front elevation of a machine embodying the invention, the cabinet and cash drawer therefor being omitted and the crank handle broken away.

The keyboard, referring to Fig. 1, comprises four banks of amount keys 10, one bank of special transaction keys 11 and one bank of initial keys 12. A detail description of the key banks will not be given herein as said banks are identical with those shown and described in the above mentioned Fuller application. The initial bank is identical with the amount banks except the designations. This bank is also connected to the release mechanism for the machine, forcing the operator to register his or her initial with each transaction. Described in brief terms the keys of these banks are mounted in individual key frames 13 (Figs. 1 and 2) which are mounted on cross rods 14 and 15 (Fig. 2), supported by brackets carried by the bars 16 and 17 between the side frames 18 and 19. Projecting laterally from each of the key frames 13 are two studs 20 and 21, upon which are slidably mounted (for each bank) a detent 22, held in its normal position by a spring 23 that is stretched between said detent and the upper end of a lever 24 mounted upon the stud 20. Projecting laterally from each of the key shanks 25 is a stud 26 which, when one of the keys is depressed, engages a notch 27, associated therewith, formed in the detent 22 and moves said detent downward. This movement of the detent 22 disengages a formed portion 28 on said detent from a shoulder 29 formed in an arm 30 integral with the lever 24, thereby permitting the spring 23 to rock said lever counter clockwise about the stud 20, until a shoulder 31 adjacent the shoulder 29 engages the projection 28, thereby arresting movement of the lever 24, and holding the said detent in its downward position.

Operating mechanism.

Figures 2, 9:
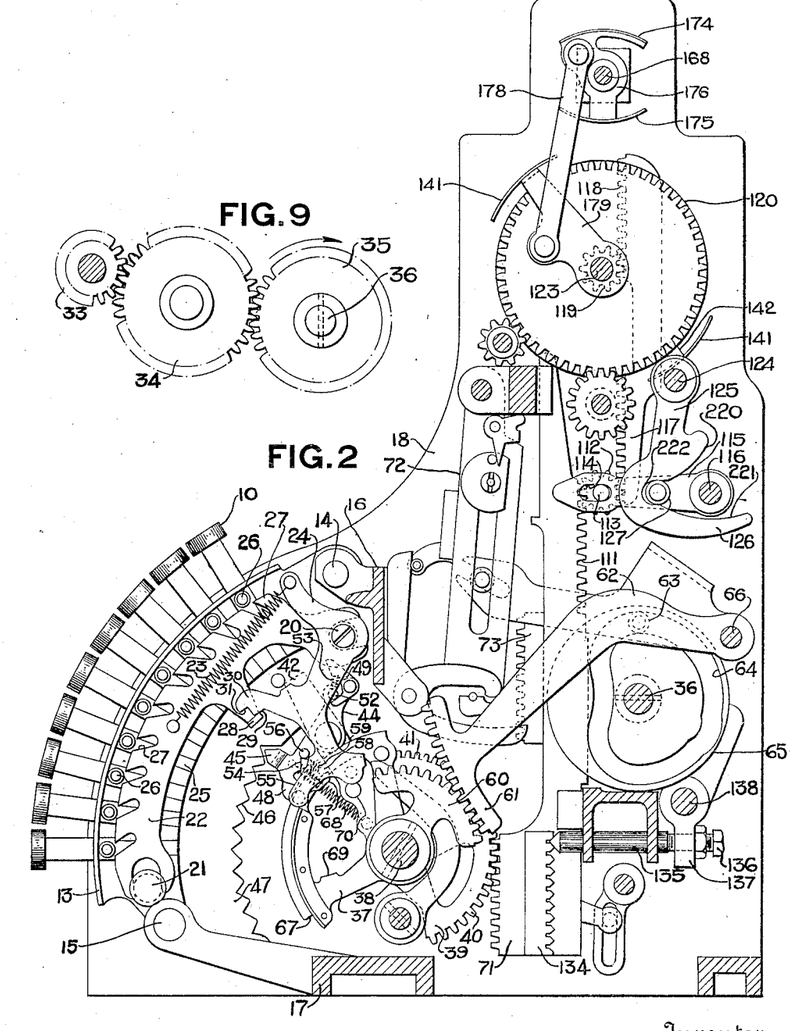
Fig. 2 is a vertical sectional view taken on line 2—2 of Fig. 1 and looking in the direction indicated by the arrows.
Fig. 9 is a detail view of the driving gearing coöperating with the operating crank.

The operating mechanism is shown in Figs. 1 and 9 and consists of a crank handle 32 having fast thereon a pinion 33 that meshes with a gear 34 which in turn meshes with a gear 35 fast upon a cam shaft 36 (Fig. 2) rotatably mounted in bearings in the side frames 18 and 19. The ratio of the gears is such that two clockwise revolutions of the crank handle cause the cam shaft 36 to be revolved once in a clockwise direction.

Differential mechanism.

The differential mechanism for positioning the vertical rack bars which set the indicators and which also effects addition upon the main counter is identical with the differential mechanism fully described and illustrated in the above mentioned Fuller application, therefore but a brief description will be given thereof herein. This mechanism comprises, referring to Figs. 2 and 11 actuating segments 37, one for each bank of keys, said segments being fast upon a horizontal rock shaft 38 mounted in bearings in the side frames 18 and 19 (Fig. 1). Loosely mounted adjacent each of the segments 37 is a differential gear segment 39 provided with two sets of teeth 40 and 41, the purpose of which will be hereafter explained. Integral with each of the differential segments 39 is a radially extending arm 42 having pivoted thereon a latch lever 44. Integral with the lower end of the latch lever 44 is a tooth 45, coöperating with notches 46 of a latch plate 47 integral with the key frame 13, and a foot 48 adapted to slide upon the peripheral edge of the actuating segment 37. A bell crank shaped pawl 49 pivoted to the upper end of the latch lever 44 has one arm normally held in engagement with a pin 52 on lever 44, by a spring 53 compressed between the pin 52 and a nose on the other arm of the pawl 49.

Figure 11:
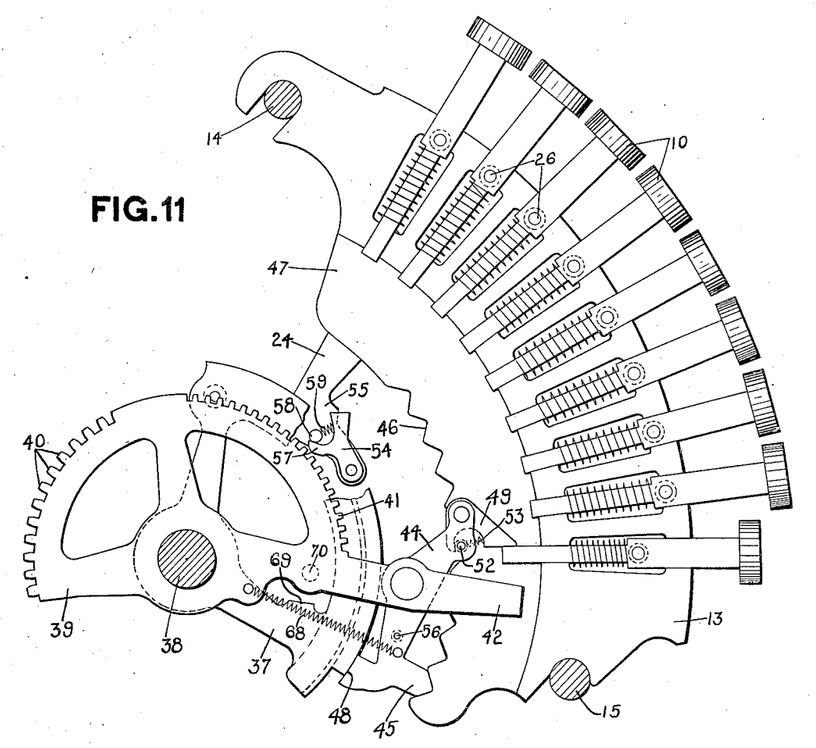
Fig. 11 is a detail sectional view taken just to the left of any one of the banks of keys in Fig. 1 and looking toward the right of said figure.

When the parts are all in their normal home positions, as viewed in Fig. 2, the foot 48 of the latch lever 44 is held away from the segment 37 by a pawl 54, pivoted on an arm 55 of the lever 24, said pawl engaging a pin 56 carried by said latch lever. The pawl 54 is provided with a tail 57 normally held against a stud 58 on the arm 55, by a spring 59 compressed between said stud and the pawl (Fig. 11).

The means for driving the actuating segments 37 comprises, (Fig. 2), a toothed segment 60, fast upon the shaft 38, meshing with another toothed segment 61 integral with an arm 62 carrying an anti-friction roller 63 projecting into a cam race 64, formed in a cam disk 65 fast upon the cam shaft 36. The arm 62 is loosely mounted upon a shaft 66 carried by the side frames 18 and 19.

When none of the amount keys have been depressed for a previous operation and the machine is operated, the parts will assume the position shown in Fig. 2, this being the zero position of all parts.

When one of the keys 10 is depressed (Fig. 11) the stud 26 enters its associated slot 27 of the detent 22 thereby causing said detent to be moved downward. The downward movement of the detent 22 allows the lever 24 to be rocked, through the action of the spring 23, in a counter-clockwise direction whereby the shoulder 29 will be disengaged from the lip 28 and the shoulder 31 will be engaged therewith. This also causes the pawl 54 to be disengaged from the pin 56 thereby allowing foot 48 of the latch lever 44 to ride upon the periphery of the actuating segment 37. When the crank handle is operated the actuating segments 37 are moved first in a clockwise direction, said movement being caused by the segments 60 and 61 which are moved through the operation of the cam disk 65. The segment 37 is rocked clockwise a distance sufficient to allow the foot 48 to drop beneath a shoulder 67 of the segment 37, so that when said segment is rotated in a counter-clockwise direction the latch lever 48 and differential segment 39 will be rocked in a counter clockwise direction until the nose of the pawl 49 strikes the shank of the key depressed.

When the nose of the pawl 49 strikes against the depressed key it causes the latch lever 44 to be rocked clockwise, thereby disengaging the foot 48 from the shoulder 67 of the actuating segment 37 and causing the tooth 45 to engage one of the notches 46 of the latch plate 47, thereby causing the differential segment 39 to be stopped in a position appropriate with the key depressed.

The differential segment 39 and the latch lever 44 remain in this position until a subsequent operation of the machine at which time when the actuating segment 37 is rocked in a clockwise direction said segment picks up the differential segment 39 by means of the engagement of a projection 69 integral with the actuating segment 37, which engages a pin 70 carried by each of the differential segments 39. This also causes the latch levers 44 to be rocked slightly counter clockwise so that the foot 48 will again drop beneath the shoulder 67 in order that when the actuating segment 37 is again rocked counter clockwise it will carry said latch lever and differential segment 39 until the latch is broken by the engagement of its pawl with a depressed key shank as previously described. If no new key has been depressed the pin 56 on the lever 44 will pass above the spring pressed pawl 54 which is then in effective position, the lever 24 being in normal position (Figs. 2 and 11). When the segment 37 then receives its counter clockwise movement the latch lever and differential segment will be held against movement.

The teeth 40 on each of the differential segments 39 mesh with teeth on vertical rack bars 71 (Figs. 2 and 3) so that when the segments are positioned as described above, the rack bars 71 are differentially positioned to control the setting of the indicators and the accumulation of the amount upon the main counter as will be hereinafter described.

Main counter.

The main counter 72 (Fig. 2) is identical with the one illustrated and described in the above mentioned Carroll patent, and the engaging mechanism of said counter, for the key set machine, is fully illustrated and described in the above mentioned Fuller application, therefore it is thought sufficient to state here that the engagement of said counter is controlled by the transaction bank of keys 11 (Fig. 1) so that when either the "Cash" or "Received on account" key is depressed the counter wheels of the counter will be engaged with adding racks 73 (Fig. 2) carried by each of the rack bars 71, in order that these amounts above mentioned may be accumulated upon said counter. When either "Charge" or "Paid out" keys are depressed the counter is not engaged with the adding rack therefore nothing is accumulated upon said counter during these operations as explained in full in said application.

Special counters.

In addition to the main counter the machine is provided with four step by step special counters arranged to register the number of different kinds of transactions such as "Cash", "Received on account", "Charge" and "Paid out". Each of these counters comprises (Figs. 1 and 3) four counter wheels 75 rotatably mounted upon a shaft 76 journaled in a curved channel frame 77 fastened to a plate 78 mounted upon the rods 14 and 15 in the same manner as the key frames 13. Secured to each counter wheel is a ratchet 79 engaged by a spring pressed differentially tined pawl 80 loosely mounted upon a shaft 81 carried by parallel arms 82 that are connected by a bail 43 (Fig. 3) and which are loosely mounted upon the shaft 76. The right hand arm 82 (as viewed from the front in Fig. 1) is securely fastened to a plate 83, rotatably mounted upon the shaft 76, said plate carries a stud 84 that projects through a radial slot 85 formed in the plate 78. Pivoted to the stud 84 is a link 92 the other end of which is pivoted on a pin 86 carried by another link 87. The link 87 is provided with a pin 88 which projects through a slot 89 (Fig. 3) formed in the plate 78. These links 92 and 87 are held in their normal home positions as viewed in Fig. 3, by means of a coil spring 90 that is strained between the stud 84 and a stud 91 carried by the plate 78.

Figures 3, 4, 10:
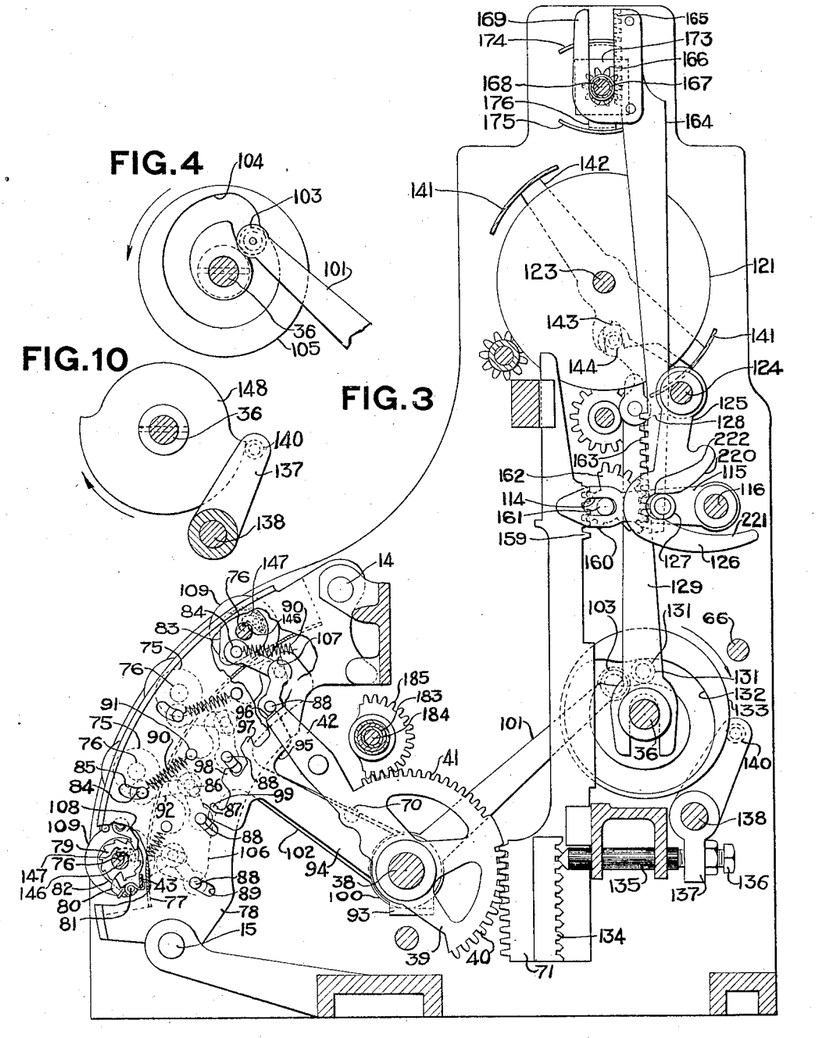
Fig. 3 is a vertical sectional view taken on line 3—3 of Fig. 1, looking in the direction indicated by the arrows and having the initial bank removed for the sake of clearly showing the special counters.
Fig. 4 is a detail view of the special counter operating cam, the lever coöperating therewith being broken away.
Fig. 10 is a detail view of the alining cam and arm coöperating with the alining pin for the vertical rack bars.

Rigidly secured to the differential segment 39, associated with the transaction bank of keys, is one end of a bail 93 (Figs. 1 and 3). The other end of the bail has integral therewith an arm 94 provided with a segmental portion 95 having formed thereon four projections 96, 97, 98 and 99, the purpose of which will be hereinafter explained.

Since the arm 94 and differential segment 39 (Fig. 3) are secured together said arm will be differentially positioned simultaneously with the position of said segment according to the key depressed, so that when, for example, the "Cash" key is depressed the arm 94 will stop in such a position that the projection 96 of the segment 95 will be positioned beneath the pin 88 of the "Cash" counter as illustrated in Fig. 3. Should the "Received on account" key be depressed the segment 95 will be moved so that the projection 97 thereon will be positioned directly beneath the pin 88 which coöperates with the "Received on account" counter. The projection 98 of the segment 95 coöperates with the pin 88 associated with the "Charge" counter and the projection 99 coöperates with the pin 88 that is associated with the "Paid out" counter.

Pivotally mounted upon the shaft 38 is a bell crank lever 100 (Fig. 3) having two arms 101 and 102. The arm 101 as viewed in Figs. 3 and 4, is provided with an antifriction roller 103 that engages a cam race 104 formed in a cam disk 105 fast on the cam shaft 36. Integral with the arm 102 (Fig. 3) is a segmental portion 106 provided with four slots 107 which engage the pins 86 which it will be remembered are carried by the links 87.

The configuration of the cam race 104 (Fig. 4) is such that at the proper time and during the revolution of the cam shaft 36, as previously described, the arm 101 is rocked in a counter clockwise direction (Fig. 3). This movement also causes the arm 102 and the segment 106 to be rocked counter clockwise thereby causing the toggle composed of links 92 and 87, through the engagement of the slot 107 with the pins 86, to be straightened out. As the links 92 and 87 are being straightened out the pins 88 carried by each of the links 87 slide idly in the slots 89, formed in the plate 78. Should there be an obstruction (one of the projections 96, 97, 98 and 99) placed beneath one of the pins 88 the links would still straighten out but instead of the pin 88 sliding idly in the slot 89 it would stop against the obstruction thereby causing the stud 84 to be moved around the shaft 76 which causes the plate 83 to be rocked in a clockwise direction. This clockwise rotation of the plate 83 is sufficient to cause the parallel arms 82 to be rocked clockwise, it being remembered that said arms are fast to said plate, which causes the differentially tined pawl 80 to actuate the ratchet 79 of the counter wheels 75 to cause "1" to be added upon the proper counter.

At the proper time the arms 101 and 102 and segmental portion 106 are rocked clockwise (Fig. 3) thereby causing the links 92 and 87 to be returned to their normal positions as shown in Fig. 3. This also causes the plate 83 and the pawl 80 to be returned to their home position. In order to prevent any retrograde movement of the counter wheels 75 there are provided spring pressed retaining pawls 108 that engage the teeth of said ratchets 79.

The special counters may be turned to zero or reset separately at any time. Each of the shafts 76 has fastened thereon a knurled disk 109 (Figs. 1 and 3) which projects through slots 110 (Fig. 1) made in the front of the cabinet. By turning the disk 109 in a clockwise direction (Fig. 3) the shaft 76 also turns. This shaft 76 is provided with a notch 146 which engages a pawl 147, carried by each of the counter wheels 75. As said shaft turns, this pawl is engaged by the notch in the shaft thereby causing the counter wheels to be turned to zero.

*Indicators.*

The indicators for indicating the amount and clerk's initial and mechanism for setting same commensurate with the key or keys depressed will now be described and comprises (Figs. 1 and 2). The vertical rack bars 71 are each provided with rack teeth 111 (Fig. 2) which mesh with a pinion 112 fast on a stub shaft 113 rotatably mounted in an elongated slot 114 formed in the bifurcated end of an arm 115. These arms 115 (one for each bank of keys) are pivotally mounted upon a horizontal shaft 116 carried by the side frames 18 and 19. Meshing with each of the pinions 112 is a rack 117 which has formed thereon another set of rack teeth 118 that mesh with a pinion 119, one of which is secured to each of four amount indicator wheels 120 (Fig. 1) and one is also secured to one of two clerks' initial indicator wheels 121. The two wheels 121 are secured to each other by means of a hub 122 (Fig. 1). The indicator wheels 120 and 121 are all loosely mounted upon a shaft 123 except the tens amount wheel, said wheel being fast upon said shaft. This shaft 123 is rotatably mounted in the side frames 18 and 19.

Mounted fast upon a shaft 124 (Figs. 2 and 3), mounted in the side frames 18 and 19, are five arms 125 each having integral therewith a hook 126 which engages an anti-friction roller 127, carried by each of the arms 115. The hook 126 is formed with two cam faces 220 and 221 and having in the crotch of the hook between the cam faces a recess 222. The recess 222 normally engages the roller 127 (Fig. 2) and holds the arm 115 and the rack 117 against movement and an alining mechanism, to be hereinafter described, holds the rack bars 71 against movement. As will be hereinafter described, the arm 125 is rocked clockwise to release the roller 127 from the recess 222 so that when the rack bars 71 are moved upward, as previously described, the arm 115 is rocked in a clockwise direction. With the arm 115 at any position above center, when the arm 125 is rocked counter clockwise, as will be hereinafter described, the cam face 220 engages the roller 127, thereby rocking the arm 115 counter clockwise, whereby the rack 117 is moved downward through the pinion 112, to set the indicators commensurate with the value of the upward movement of the rack bar 71. In a subsequent operation of the machine, the rack bar 71 is lowered to normal position, thereby causing the arm 115 to be rocked in a counter clockwise direction to a position below center, therefore, in this operation of the machine, when the arm 125 is rocked in a counter clockwise direction the cam face 221 engages the roller 127, whereby the arm 115 is rocked in a clockwise direction to the position shown in Fig. 2 and the recess 222 again engages the roller 127 to maintain the parts in the normal position.

Mounted fast on the shaft 124 is a bell crank 128 (Figs. 1 and 3), the lower end of which has pivotally fastened thereto the upper end of a pitman 129 bifurcated to straddle the shaft 36. This pitman 129 carries an anti-friction roller 131 that engages a cam race 132 formed in a disk 133 fast on the shaft 36.

During the first part of the revolution of the shaft 36 the pitman 129 (Fig. 3) is moved upward, and causes the bell crank 128 to be rocked clockwise. This movement causes the shaft 124 and the arms 125 to be rocked clockwise, as it will be remembered the bell crank 128 and the arms 125 are all fast upon said shaft. This movement causes the hooks 126 to be disengaged from the rollers 127 thereby allowing the arms 115 to be oscillated.

The mechanisms are so timed that after the pitman 129 has been moved as above described, the clockwise movement of the actuating segments 37 causes the differential segments 39 to be moved clockwise, that is, if any of said differential segments were left in any position except zero during a previous operation, which returns them to their zero position, thereby causing all of the rack bars 71 (not in zero position) to be moved downward to their zero positions. This downward movement of the rack bars 71 causes the arms 115, through the pinions 112 and rack teeth 111, to be rocked counter clockwise. The movement of said arms and pinions does not cause the racks 117 to be moved as the pinions 112 simply roll over the racks 117 which are in the position in which they were left the previous operation.

When the differential segment 39 is rocked counter clockwise, as previously described, the teeth 40 thereof cause the rack bar 71 to be moved upward to a position corresponding to whichever key, associated with said segment, has been depressed. This upward movement of the rack bar 71 causes the pinion 112, through the engagement of the teeth 111 therewith, to be rotated in a clockwise direction. This also causes the arm 115, associated with this bank, to be rocked in a clockwise direction. As the arm 115 is being rocked the pin 113, carrying the pinion 112, will slide along the slot 114.

After the rack bar 71 has been differentially positioned, as described above, the pitman 129 is moved downward thereby causing the bell crank 128 and shaft 124 to be rocked in a counter clockwise direction. This counter clockwise movement causes each arm 125 to be rocked in a counter clockwise direction, thereby causing the hook 126 integral therewith, to engage the anti-friction roller 127, thereby causing the arm 115 to be rocked either in a counter clockwise or clockwise direction, depending on which of the cam faces 220 or 221 engages the roller 127. This movement will cause the pinion 112 to be moved up or down and through its engagement with the rack 117, said rack is moved either upward or downward thereby positioning the indicator wheels 120 to indicate the amount and clerk's initial commensurate with the keys depressed. The indicator wheels are turned through the engagement of the teeth 118 with the pinions 119 secured to each of said wheels.

The rack bars 71 are held in alinement while the indicators are being set by means of notched plates 134, one of which is securely fastened to each of said rack bars. Each of these notched plates 134 is engaged by an alining pin 135 controlled by an adjusting screw 136 carried by a lever 137 which is rotatably mounted upon a shaft 138 mounted in side frames 18 and 19. The lever 137 carries an anti-friction roller 140 that is engaged by the periphery of a cam disk 148 (Fig. 10), said disk being formed so that at the proper time lever 137 is held in the position shown in Figs. 2 and 3 thereby causing the pins 135 to be held firmly each in one of the notches of the notch plate 134.

While the indicator wheels 120 and 121 are being set they are hidden from view by means of flash plates 141 fastened to a lever 142 rotatably mounted upon the shaft 123. The lever 142 is provided with a slot 143 which engages a stud 144 carried by the upper end of the bell crank 128. When the bell crank 128 is rocked in a clockwise direction, as previously described, the lever 142 is rocked in a counter clockwise direction a distance sufficient to cause the flash plate 141 to cover up the openings in the cabinet (not shown) thereby hiding the indicator wheels from view while they are being set as described above. When the indicators are set the plates 141 are moved to normal position thereby exposing the indicators.

By referring to Fig. 1 it will be seen that the machine herein is provided with a double indication, that is, a front and back indication. The setting of the front indication having been described above, it is deemed sufficient to state that the companion indicators 145 for indicating the amounts to the rear of the machine are connected to the indicators 120 by the well-known gear, shaft and sleeve connections, fully shown and described in the hereinbefore mentioned Carroll patent.

Special transaction indicators.

When any one of the keys 11 of the special transaction bank has been depressed and the differential segment 39 (Fig. 3) associated with said bank is differentially positioned, it causes the rack bar 71 to be moved to a corresponding position. The rack bar 71 associated with the special transaction bank is provided with a set of rack teeth 159 (Fig. 3) which mesh with a segment 160 that is fast upon a pin 161 rotatably and slidably mounted in the slot 114 of the arm 115 associated with said bank. Integral with the segment 160 is a segment 162 that meshes with a rack 163 formed in a bar 164. Formed in the upper end of the bar 164 is a set of rack teeth 165 which mesh with a pinion 166 fast upon a sleeve 167 rotatably mounted upon a shaft 168, said shaft being mounted in the side frames 18 and 19. Fast upon the upper end of each side of the bar 164 are two U-shaped plates 169 (Figs. 1 and 3) which surround the sleeve 167, thereby holding the rack teeth 165 always in mesh with the pinion 166 and at the same time preventing any excessive lateral motion between said rack teeth and said pinion. The pinion 166 is provided with a hub 170 which has a mortise and tenon connection with a sleeve 171 rotatably mounted upon the shaft 168. Fast upon the sleeves 167 and 171 are indicator blocks 172 and 173 respectively. When the arm 125 is rocked (as hereinbefore described) in a counter clockwise direction, the hook 126 engages the anti-friction roller 127 carried by the arm 115, thereby causing said arm to be brought to a position as shown in Fig. 3. This movement of the arm 115 causes the segment 162 to be rocked which causes the bar 164 to be moved to position the indicator blocks 172 and 173 to indicate the transaction appropriate with the key depressed, the movement of said indicator blocks being occasioned by the engagement of the rack teeth 165 with the pinion 166.

The flash mechanism for the special transaction indicators will now be described and comprises two flash frames, each having (Figs. 1, 2 and 3) two flash plates 174 and 175 carried by two pairs of parallel arms 176 and 177 all fast upon the shaft 168. Pivotally fastened to the right hand arm 176 (Figs. 1 and 2) is a link 178 the lower end of which is pivotally fastened to an arm 179 that is secured to the flash plate 141 and is loosely mounted upon the shaft 123.

When the flash plates 141 are rocked as previously described, the arm 179 causes the link 178 to rock the flash plates 174 and 175 to conceal and expose the transaction indicators simultaneous with the amount indicators.

Printer.

The preferred printing mechanism is substantially identical with the printing mechanism fully described and illustrated in the above mentioned Carroll patent, except that in the present machine two extra type wheels have been added to take care of the clerk's initial bank and the special transaction, as will readily be seen by referring to Fig. 1. The four amount wheels 180, one special transaction type wheel 181 and one clerk's initial type wheel 182 are mounted upon a nest of sleeves 183 (Fig. 3) which are loosely mounted upon a shaft 184 that is supported by the parallel side frames 17 and 18. Each of the nested tubes 183 has fastened thereto a segment 185 which meshes with the teeth 41 of each of the differential segments 39 so that when the said segments are differentially positioned the type wheels will be differentially positioned to print upon a record strip an entry commensurate with the keys depressed.

Operation.

An operation of the machine will now be described, it being assumed that all parts are in their zero position to start.

As illustrated in Fig. 2, let it also be assumed that clerk E is making a "Received on account" transaction of $1.29. The clerk first presses the E key to represent his initial and then the "Received on account" key and then the keys representing the amount received are depressed. The operating handle 32 (Fig. 1) is then given two complete revolutions in a clockwise direction, which, through the train of gears illustrated in Fig.

9, cause the cam shaft 36 to receive a clockwise revolution.

During the first part of the revolution of the shaft 36, the arm 125 (Fig. 2) is rocked clockwise, thereby disengaging the roller 127 from the hook portion of said arm, after which, through the medium of the actuating segment 37, differential segment 39 and the latch mechanism, which have been previously described, the rack bar 71 associated with the units amount bank is moved upward to the 9 position, the rack bar 71 of the other banks are moved corresponding to the value of the other keys depressed.

The upward movement of the rack bar 71 through the pinion 112, rocks the arm 115 in a clockwise direction.

After the arm 115 has been positioned, the arm 125, through the medium of the pitman 129, cam disk 133 and bell crank 128, is rocked in a counter clockwise direction whereby the cam face 220 engages the roller 127 and rocks the arm 115 counter clockwise to the position shown in Figs. 2 and 3. This movement causes the rack 117 to be moved downward, thereby rotating the indicator wheels 120 in a clockwise direction to indicate the amount commensurate with the value of the key depressed, the rack bar 71 being held at this time by the pin 135 held against movement by the cam disk 148 (Fig. 10).

When the pitman 129 is moved upward the flash plates 141, through the bell crank 128, are rocked counter clockwise to conceal the indicator wheels while they are being set and when the pitman 129 is moved downward the flash plates 141 are moved back to normal position to expose the positioned indicator wheels of both the front and back indication.

When the rack bar 71, associated with the special transaction bank, is moved upward the arm 115 associated therewith is rocked clockwise and the segment 162 also receives a clockwise oscillation so that when the arm 125, associated with this bank, is rocked counter clockwise to engage the roller 127 and move the arm 115 downward to normal position, the bar 164 is moved downward and rocks the indicator block 173 in a clockwise direction to indicate the class of transaction, which, in this case, is "Received on account."

When the flash plates 141 are rocked to conceal and expose the indicator wheels 120, the flash plates 174 and 175 are simultaneously rocked through the medium of a link 178 to conceal and expose indicator block 173 of both the front and back indication.

At the proper time and just before the rack bar is moved, the counter 72 (Fig. 2) is rocked in a counter clockwise direction to position the counter wheels of said counter so that they will be engaged by the adding racks 73. As the rack bars 71 start upward, the counter 72 is moved downward whereby the amount commensurate with the value of the keys depressed is accumulated upon the counter wheels through their engagement with the adding racks 73, after which said counter is rocked out of engagement and then moved upward to normal position.

The differential mechanism associated with the bank of special counters is positioned so that the projection 97 (Fig. 3) integral with the arm 94, lies directly behind the pin 88, associated with the "Received on account" counter, thereby causing one to be added upon said counter when the segment 106 is moved downward thereby causing the toggle, composed of links 87 and 92 when they are straightened out, to rock the plate 83.

In a subsequent operation of the machine and when the rack bar 71 is moved downward to its zero position as previously described, the arm 115 is rocked counter clockwise to a position below the center and if the "1" key has been depressed for this operation, the rack bar 71 is moved upward only one step, thereby rocking the arm 115 slightly clockwise. When the arm 125 is rocked counter clockwise during this operation, the cam face 221 engages the roller 127, due to the fact that the arm 115 is positioned below center instead of above center, as is the case when the "9" key was depressed in the previous operation.

*Modifications.*

The mechanisms described above are very well adapted to be used in connection with a lever set machine such as shown in said Carroll patent simply by changing the timing of movements as will be hereinafter described.

Figures 5, 6, 7, 8:
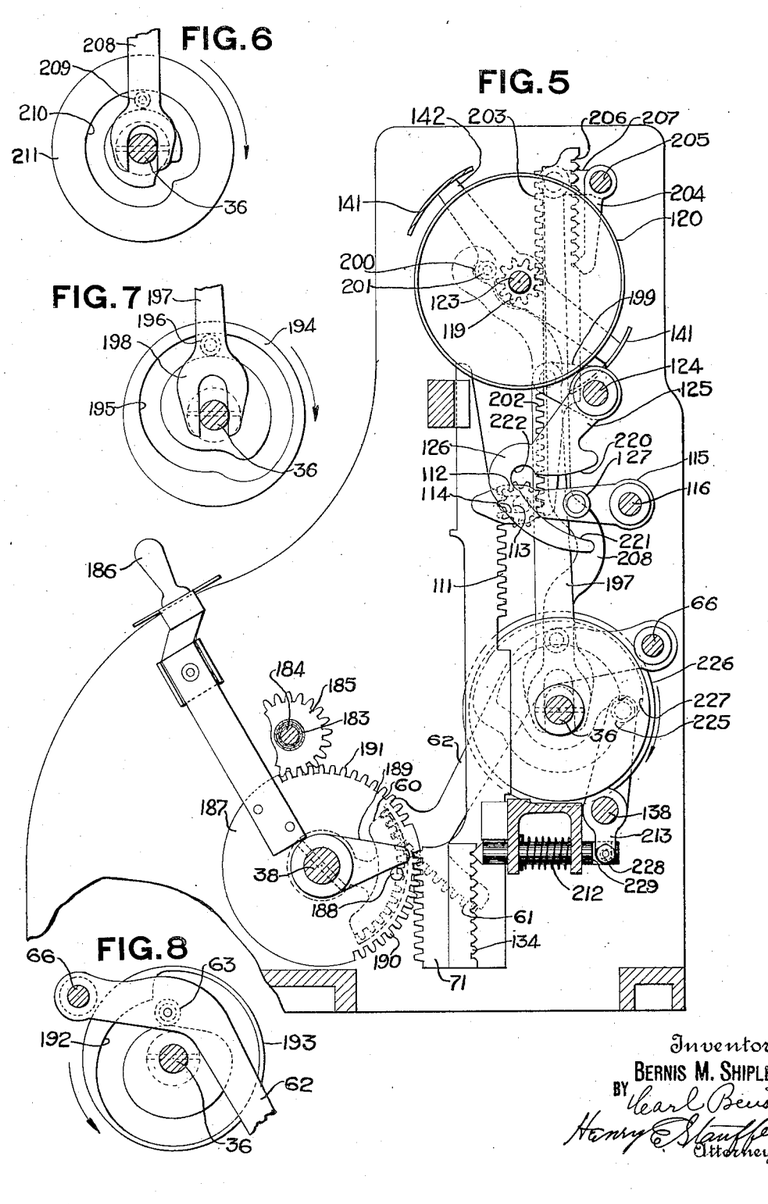
Fig. 5 is a vertical sectional view taken through a "lever set" machine and illustrates the improved indicator controlling mechanism adapted to said machine.
Fig. 6 is a detail view of the indicator alining cam, for the lever set machine, the pitman coöperating therewith being broken away.
Fig. 7 is a detail view of the indicator operating cam, for the lever set machine pitman coöperating therewith being broken away.
Fig. 8 is a detail view of the lever return cam, the arm coöperating therewith being broken away.

To set up an amount on a lever machine the operator moves a hand lever 186 downward, which causes a disk 187, fast thereto, to be rotated in a counter clockwise direction a distance corresponding to the amount which has been set up by the lever 186. Each of the disks 187 is provided with a laterally projecting pin 188 which engages an arm 189 fast upon the shaft 38 and causes said arm to be rocked counter clockwise as the disk is being positioned. Each disk 187 is also provided with two sets of teeth 190 and 191 the purpose of which will be hereinafter explained. Also fast upon the shaft 38 is the segment 60 which meshes with a segment 61 integral with the arm 62 as is the case in the key set machine described above. The arm 62 carries an anti-friction roller 63 which engages a cam race 192 formed in a disk 193 fast upon the cam shaft 36 (Fig. 8). The cam race 192 is so formed that when the lever 186 is moved downward, it gives ample clearance for the roller 63 which is moved upward by the arm 189 through the medium of shaft 38, segments 60 and 61 and arm 62.

At the proper time and during the latter part of the revolution of the shaft 36 the arm 62 is rocked counterclockwise (Fig. 5) thereby rocking the segment 60, the shaft 38 and arms 189 clockwise whereby said arms engage the pins 188 of the disks 187 thereby restoring said disks and the levers 186 to normal position.

As the disk 187 is rotated counter clockwise it causes the rack bar 71 to be moved upward which causes the pinion 112 to be rotated clockwise through the engagement of the teeth 111 therewith, and also causes the arm 115 to be rocked in a clockwise direction.

The arm 125 (Fig. 5) is in a different home position than is shown in Figs. 2 and 3 of the key set machine. In the key set machine the keys are depressed which set up a condition so that the differential segments are positioned by an operation of the machine. In the present machine the differential disks are manually positioned as is also the rack bar 71, therefore necessitating a different timing of the arm 125 so as to allow the arm 115 of the lever machine to be rocked by the manual movement of the lever 186, as will be hereinafter described.

After the rack bars 71 have been positioned they are each held in alinement by an alining pin 212. Pivotally mounted upon the shaft 138 is a lever 213, the lower end of which carries an eccentric stud 228 which operates in a notch 229 formed in the pin 212. The upper end of the lever 213 carries an antifriction roller 225 which engages a cam race 227 formed in the side of a disk 226 secured to the shaft 36.

The stud 228 has sufficient clearance in the notch 229 to allow the alining pin 212 to be moved backward and forward over the notches 134 during the time the lever 186 is being positioned to set the rack bar 71. After the levers 186 have been set to position the rack bars 71, the shaft 36 is given one complete clockwise revolution, during the very first part of which the lever 213 is rocked clockwise by the race 227 whereby the stud 228 is moved so that it engages the forward edge of the notch 229 thereby holding the alining pins 212 so that the rack bars 71 and consequently the levers 186 are immovable during the setting of the indicators, to be hereinafter described. The lever 213 and the disk 226 are normally positioned so that the roller 225 engages a portion of the race 226 midway between the high and low portions of said race.

During the latter half of the revolution of the disk 226 the cam race 227 causes the lever 213 to be rocked counterclockwise thereby causing the stud 228 to engage the rear edge of the notch 229 and move the pin 212 out of engagement with the notches 134, so that during the restoration of the levers 186, previously described, the pins 212 will not be allowed to ride in and out over the notches 134. The lever 213 is then rocked to normal position so that the pins 212 will again engage the notches 134.

Fast upon the shaft 36 is a disk 194 (Fig. 7) in which is formed a cam race 195 within which fits an anti-friction roller 196 carried by a pitman 197. The lower end of the pitman 197 is bifurcated at 198 to surround the cam shaft 36, the upper end of said pitman is pivotally mounted to an arm 199 that is fast upon the shaft 124 (Fig. 5). The extreme upper end of the pitman 197 is formed with a slot 200 engaging a pin 201 carried by the lever 142.

At the proper time during the revolution of the shaft 36 and after the rack bar 71 has been differentially set, the disk 194 (Fig. 7) causes the pitman 197 to be moved downward which causes the arm 199 and the shaft 124 to be rocked in a counter clockwise direction. This counter clockwise movement of the shaft 124 causes the arm 125 to be moved likewise to cause the hook 126 to engage the roller 127 of the arm 115 thereby bringing said arm to a position as shown in Fig. 5. This movement of the arm 115 causes the pinion 112 to be moved either up or down all depending upon the position in which it was set during a previous operation. This pinion 112 meshes with teeth on a rack 202 having another set of rack teeth 203 at its uppermost end that mesh with the pinion 119 fast to the indicator wheel 120. This movement of the pinion 112 causes the racks 202 to be moved, said racks being integral with each other, which in turn rotates the pinion 119 and indicator wheel 120 to indicate an amount commensurate with the positioning of the lever 186.

After the indicator wheels 120 have been positioned as described above, the pitman 197 is moved upward thereby rocking the arm 199 in a clockwise direction whereby the shaft 124, the arm 125 and the hook 126, integral therewith, are also rocked in a clockwise direction thereby disengaging said hook from the antifriction roller 127 that is carried by the arm 115.

The downward movement of the pitman 197 causes the flash 141 and the lever 142, through the engagement of the slot 200 with the pin 201, to be moved in a counter clockwise direction so that the opening in the machine will be closed during the positioning of the indicator wheels 120 thereby hiding their movement from view.

In the lever machine it is necessary to aline the indicator wheels. This is accomplished by means of alining pawls 204 fast upon a horizontal shaft 205, said pawls being engaged with notches 206 formed in the rear of the rack 202. At the proper time and just before the racks 202 are positioned by the pinion 112 the pawl 204 is rocked in a counter clockwise direction by means of an arm 207 which has pivotally fastened thereto a pitman 208 (Figs. 5 and 6) which carries an antifriction roller 209 that fits within a cam race 210 formed in a disk 211 fast upon the shaft 36. The configuration of the cam race 210 is such that at the proper time it causes the pitman 208 to be moved downward thereby causing a counter clockwise movement of the arm 207 and the shaft 205 and also the pawls 204 as mentioned above, thereby disengaging the pawls from the V-shaped notches 206 that are formed in the rack 202.

The teeth 191 of the disk 187 mesh with the segments 185 which are secured to the nest of sleeves 183, which have secured to their other end the type wheels as was described in the key set machine. Therefore when the disks 187 are differentially positioned these segments 185 and the type wheels will be differentially positioned to print the amount upon the record strip commensurate with the positioning of the levers 186.

*Operation.*

An operation of the indicator mechanism for the lever set machine will now be described, it being assumed that all parts are in their zero position, as illustrated in Fig. 5.

To set up an amount, the operator moves the lever 186 downward to the position corresponding to the amount which is to be registered, whereby the rack bars 71, being directly connected with the lever 186, are moved upward the distance commensurate with the positioning of said lever.

Due to this construction, the arm 125 is normally disengaged from the roller 127 so that the arm 115 may be rocked by the movement of the rack bar 71.

The alining pin 212 is free in the home position but is locked in one of the notches 134 immediately after the beginning of the operation of the crank handle, whereas in the key set machine it will be remembered that the alining pin 135 is locked in the home position to prevent movement of the rack bars 71 and also the differential mechanism.

After the rack bars 71 have been set the arm 125 is rocked through the medium of pitman 197, cam 194 and arm 199 in a counter clockwise direction to rock the arm 115 to the position shown in Fig. 5, whereby the indicator wheels 120 are positioned to indicate commensurate with the setting of the lever 186.

Due to the fact that the arm 125 is normally disengaged from the roller 127, the indicator wheels 120 are normally held in alinement by the alining pawl 204, which is disengaged at the proper time before the arm 125 is rocked to move the arm 115, as mentioned above.

After the indicators have been set the levers 186 are restored to normal position by the cam race 192, arm 62, segment 60, arm 189 and pin 188.

While the form of mechanism herein shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination with a series of differentially adjustable setting elements, of a series of keys for controlling the adjustment of the same, a series of indicators, racks for operating said indicators, pinions intermediate said indicator racks and the setting elements said pinions being carried by pivoted levers, and means for moving said pivoted levers to a common position after said setting elements have been adjusted.

2. In a machine of the class described, the combination with a differentially adjustable setting element, of means for controlling the adjustment of the same, an indicator, indicator setting means, a pinion intermediate the setting element and the indicator setting means, and means for moving the axis of said pinion to a common position at each operation of the machine.

3. In a machine of the class described, the combination with a differentially adjustable rack bar, of a series of keys for controlling the differential adjustment of the same, an indicator, a rack bar operatively connected to said indicator, a pinion intermediate said rack bars, and means for moving the axis of said pinion to a common position at each operation of the machine.

4. In a machine of the class described, the combination with a differentially adjustable rack bar, of a series of keys for controlling the differential adjustment of the same, an indicator, a rack bar operatively connected to said indicator, a pinion intermediate said rack bars, and means for moving the axis of said pinion to a common position after said first mentioned rack bar has been adjusted.

5. In a machine of the class described, the combination with a differentially adjustable rack bar, means for controlling the differential adjustment of the same, an indicator, a rack bar operatively connected to said indicator, a pinion intermediate said rack bars, and means for moving the axis of said pinion to a common position at each operation of the machine.

6. In a machine of the class described, the combination with a differentially adjustable rack bar, means for controlling the differential adjustment of the same, an indicator, a rack bar operatively connected to said indicator, a pinion intermediate said rack bars, and means for moving the axis of said pinion to a common position after said first mentioned rack bar has been adjusted, said adjustment causing said second mentioned rack bar to be adjusted.

7. In a machine of the class described, the combination with a differentially adjustable setting element, of means for controlling the adjustment of the same, an indicator, indicator setting means, a pinion intermediate said setting element and said indicator means, said pinion being mounted on a pivoted lever movable to adjust the axis of said pinion, and means for moving said lever and thereby move the axis of said pinion to a common position at each operation of the machine.

8. In a machine of the class described, the combination of a differentially adjustable setting element, of means for controlling the adjustment of the same, means for locking said setting element against movement when adjusted, an indicator, an indicator setting element operatively connected to said indicator, a pinion intermediate the two setting elements, and means for moving the pinion whereby to bring the axis of the same to a common position after each adjustment of the first mentioned setting element and thereby adjust the second mentioned setting element and the indicator to a position determined by said controlling means.

9. In a machine of the class described, the combination with a plurality of counters, toggle actuators therefor, a common operating element for said toggles, a differentially movable member common to all of said counters and having a plurality of projections each appropriate to one of said toggle actuators, means for adjusting said member to bring one of said projections in the path of its appropriate toggle thereby causing an actuation of the appropriate counter when said common operating element is actuated.

10. In a machine of the class described, the combination with a plurality of counters, toggle actuators therefor, a common operating element for said toggles, a differentially movable member common to all of said counters and having a plurality of projections each appropriate to one of said toggle actuators, a series of keys for controlling the adjustment of said member to bring one of said projections in the path of its appropriate toggle thereby causing an actuation of the appropriate counter when said common operating element is actuated.

In testimony whereof I affix my signature.

BERNIS M. SHIPLEY.